United States Patent [19]

Nishihara

[11] 3,795,140

[45] Mar. 5, 1974

[54] FORCE RESPONSIVE DEVICE

[75] Inventor: Tadashi Nishihara, Tokyo, Japan

[73] Assignee: Yokogawa Electric Works, Ltd., Tokyo, Japan

[22] Filed: Dec. 20, 1972

[21] Appl. No.: 316,674

[30] Foreign Application Priority Data
Dec. 29, 1971  Japan.................................. 46-2918

[52] U.S. Cl............... 73/141 A, 73/309, 73/407 R, 74/18.1
[51] Int. Cl. ............................................. G01l 1/26
[58] Field of Search . 73/141 A, 309, 228, 406, 407, 73/408, 410, 398 R, 432 A; 74/17.8, 18, 18.1

[56] References Cited
UNITED STATES PATENTS

| 1,827,560 | 10/1931 | Binckley.............................. 74/18.1 |
| 2,612,908 | 10/1952 | Tate et al...................... 73/407 R X |
| 3,147,620 | 9/1964 | Stapler................................. 73/228 |
| 1,173,038 | 2/1916 | Roschanek........................ 73/407 R |

FOREIGN PATENTS OR APPLICATIONS

| 2,039,312 | 2/1971 | Germany........................... 73/407 R |

Primary Examiner—Charles A. Ruehl
Attorney, Agent, or Firm—Howard M. Bollinger

[57] ABSTRACT

A force responsive device such as a differential pressure transmitter or a buoyancy transmitter including a force-displacement transducer comprised of a bending tube and a deflection rod. The bending tube is mounted with one of its ends securely fixed to a mounting support and its other end free. The deflection rod extends into the tube with one of its ends fastened to the free end of the tube. The rod's other end extends out of the fixed end of the tube. When subjected to a lateral input force, the free end of the tube bends, thereby displacing or deflecting the free end of the deflection rod. The rod deflection is directly related to the lateral input force applied. Therefore, measurement of that input force in terms of rod deflection can be made. The force responsive device of the present invention also includes a suitably long transverse loading arm member mounted on the free end of the bending tube extending laterally away from the bending tube axis. This arrangement permits measurement of an input force applied to the transverse load arm member and directed parallel to the bending tube axis.

18 Claims, 15 Drawing Figures

FORCE RESPONSIVE DEVICE

BACKGROUND OF THE INVENTION

1. Field of the Invention

One method of measuring the flow rate of fluid in control processes depends on measurement of the differential pressure which develops when the fluid flows through a restrictive means, such as an orifice, disposed in the pipe line. Another method uses a displacer located in a liquid tank which has a specific gravity larger than the liquid in the system being observed. The height at which the displacer is supported changes when the level of liquid in the liquid tank changes. This method may be employed to control a fixed valve which regulates the level of a liquid material in a tank. The present invention relates to force responsive devices such as differential pressure transmitters and buoyancy transmitters.

2. Description of the Prior Art

One typical differential pressure transmitter used to measure fluid flow rate includes a force bar and a diaphragm located in a fluid pressure receiving chamber. The diaphragm responds to differential pressure which develops in the flow system and is transmitted to the pressure receiving chamber. This response is then transmitted to the bar. Thus, a force corresponding to this differential pressure is measured.

The force bar is supported by a sealing diaphragm element which serves as both a fulcrum for the force bar and a seal for the pressure receiving chamber. The sealing diaphragm should be leak-proof so as to seal the fluid in the pressure receiving chamber. Additionally, the sealing diaphragm should be constructed so that it does not deform under the influence of fluid pressure produced in the receiving chamber. Any deformation of or stress on the sealing diaphragm which occurs as a result of the fluid pressure will create a static pressure error and eventually result in a measurable output error.

One solution to this problem is to use a force responsive device having a bending tube force-displacement transducer which, in principle, is free of static pressure error. A prior art force responsive device utilizing this type of force-displacement transducer includes a bending tube, mounted with one of its ends fixed securely in a support structure and its other end free, into which a long deflection rod is inserted. The free end of the tube is sealed. One end of the deflection rod is fastened in the tube at this sealed end. In the differential pressure transmitter employing this bending tube force-displacement transducer the sealed tube is positioned with its outer wall exposed in the pressure receiving chamber, and a pressure receiving element is connected directly to the tube's free end. Differential pressure transmitted to the receiving chamber exerts an input force on the pressure receiving element at the free end of the tube which is perpendicular to the tube axis. (Note: This type of prior art bending tube force-displacement transducer will hereinafter be referred to as the "conventional bending tube transducer").

The conventional bending tube transducer, however, is not wholly satisfactory in all applications. The entire transducer is relatively large. Manufacture of the bending tube is, therefore, difficult. Substantial displacement of the tube and deflection rod cannot be obtained by merely reducing the size of the instrument. In other words, the conventional bending tube transducer lacks sensitivity. Additionally, the bending moment of the tube becomes non-linear as the input force increases, with the result that the output deflection rod displacement becomes nonlinear. Furthermore, if the input force contains any lateral component not directly perpendicular to the axis of the tube, error will readily arise.

SUMMARY OF THE INVENTION

The present invention relates to a force responsive device having a bending tube type force-displacement transducer which is small in size and rigid in construction. More specifically, this bending tube force-displacement transducer has a bending tube which is mounted with one of its ends securely fixed to a mounting support and its other end free. A deflection rod extends into the tube with one of its ends fastened to the free end of the tube and its other end extending out of the fixed end of the tube. A transverse loading arm of predetermined length is mounted on the free end of the bending tube extending radially away from the bending tube axis. An input force parallel to and a distance from the axis of the tube, is applied to the loading arm. (Note: This novel type of bending tube force-displacement transducer will hereinafter be referred to as "bending tube transducer equipped with a transverse loading arm".). This arrangement helps to minimize the stress caused in the bending tube and increases the ratio of displacement at the free end of the deflection rod to displacement at the free end of the tube. (The ratio of displacement at the free end to the deflection rod to displacement at the free end to the tube will hereinafter be referred to as the "displacement ratio".). The force responsive device of the invention may be manufactured at low cost and in relatively small dimensions. The bending tube used in this device is a cylinder having concentric inner and outer diameters throughout its entire length which define a uniformly thick cylindrical wall. Therefore, tubes of shorter length can be more easily manufactured. The input force is applied to the bending tube through the transverse loading arm so that the stress developed in the tube is uniformly distributed over the cylindrical tube wall. Therefore, stress on the cylindrical tube wall is uniformly distributed and stress concentration on certain wall areas is eliminated. Shear or permanent deformation of the tube due to stress is minimized, and the tube service life is markedly extended.

The present invention further relates to a force responsive device having a force-displacement transducer capable of offering linear output deflection rod displacement with respect to a measured input force. The inventor has ascertained that the output deflection rod displacement is proportional to the input force applied to the transverse loading arm when such input force is applied at a point on the loading arm located on a straight line which is perpendicular to the tube axis and which passes through a point on the tube axis at a distant of 425/1000 of the tube length from the tube's free end. As previously noted, the input force is applied to the loading arm in a direction parallel to the tube axis. This aspect of the present invention is more fully explained below. (The location at which the input force is applied to the loading arm will hereinafter be referred to as "load point".).

Thus, according to the present invention, the loading arm may be S-shaped or L-shaped, or installed at an acute angle with respect to the bending tube so that the load point is located on a straight line which is perpendicular to the tube axis and which passes through a point on the tube axis at a distance of 425/1000 of the tube length from the free end of the tube. Therefore, the output deflection rod displacement is linearly related to the input force over a wide input force range, and output measuring accuracy is increased.

The present invention also relates to a force responsive device capable of yielding an output deflection rod displacement which is proportional only to the input force directed parallel to the tube axis. Therefore, the measuring accuracy of the device is increased. When a lateral component of the input force influences deflection rod displacement, error arises. For example, a bending tube force-displacement transducer in the form of a buoyancy transmitter using a displacer, receives a lateral component of input force when liquid is flowing in the observed system. The rod displacement deviates under the influence of this lateral force component and the output displacement becomes disproportional to the buoyancy, causing measurable error to result. When the bending tube force-displacement transducer equipped with a transverse loading arm is utilized, it has been theoretically and experimentally found that output deflection rod displacement is proportional only to the input force directed parallel to the tube axis when such input force is applied to a load point on the load arm located on a straight line which is perpendicular to the tube axis and which passes through a point on the tube axis at a distance one-half of the tube length from the tube's free end. Thus, even if the measuring liquid is flowing, the output displacement is accurately proportionated only to the buoyancy.

The objects, aspects and advantages of the invention will be pointed out in, or apparent from, the detailed description hereinbelow, considered together with the following drawings.

Figure 1:
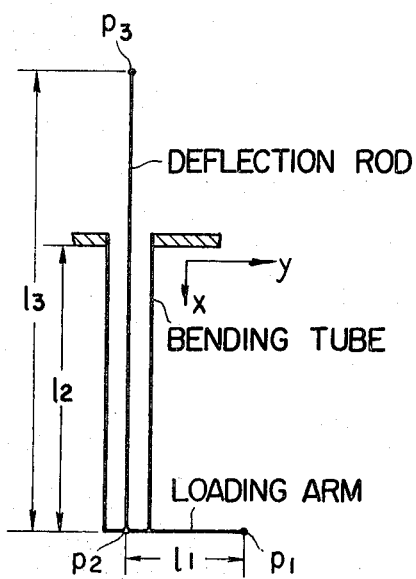
FIG. 1 is a diagram showing systematic parameters of one force-displacement transducer of the present invention including a bending tube transducer equipped with a transverse loading arm.
Figure 2:
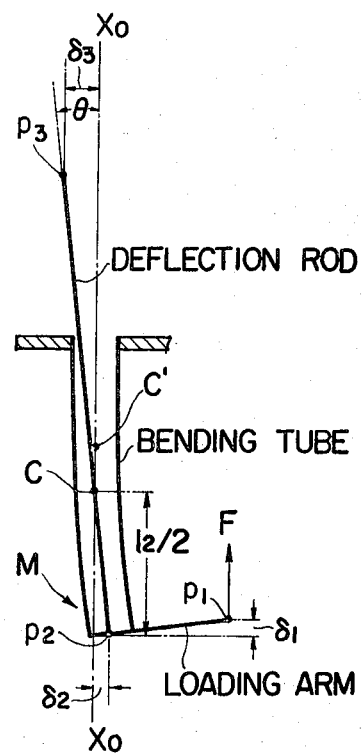
FIG. 2 is a diagram showing operation of the force-displacement transducer of FIG. 1.

DESCRIPTION OF THE PREFERRED EMBODIMENTS a. Principles of the present invention which permit achievement of a desirable displacement expansion ratio Referring to FIG. 1, the systematic parameters and operating principles of a force-displacement transducer constructed in accordance with the present invention are illustrated. Dimensions $l_1$, $l_2$ and $l_3$ represent lengths of the loading arm, bending tube, and deflection rod respectively; point $p_1$ represents a load point on the loading arm; point $p_2$ represents a point in the center of the free end of the tube (hereinafter referred to as "follower point"); and point $p_3$ represents a displacement point at the free end of the deflection rod. As can be seen in FIGS. 1 and 2, the deflection rod is diametrically movable in the tube. The second moment of area and the modulus of longitudinal elasticity of the bending tube are represented by the symbols I and E, respectively. The values of I and E are determined by the material from which the tube is made and by the tube's dimensions. Further, $x$ is the ordinate, and $y$ is the abscissa in the reference system in which the device is viewed. It is additionally assumed that the deflection rod tilts by an angle $\theta$ when a force F is applied to the load point $p_1$.

The bending moment M developed on the bending tube, through the moment arm $l_1$, is given as: $M = l_1 F$. The differential equation representing the deflection curve of the bending tube is then given as:

$$d^2y/dx^2 = M/EI = l_1 F/EI \tag{1}$$

When $x = l_2$, the deflection angle $\theta$ (in radians) is:

$$\theta = l_1 l_2 F/EI \tag{2}$$

The displacement $\delta_2$ of the tube at the follower point $p_2$ due to this deflection, (ignoring the component of deflection x-direction) is given as:

$$\delta_2 = l_1 l_2^2 F/2EI \tag{3}$$

The displacement $\delta_3$ of the deflection rod at the displacement point $p_3$, (ignoring the component of deflection in the x-direction) is given as:

$$\delta_3 = \theta l_3 - \delta_2 \tag{4}$$

From Eqs. 2 and 3, Eq. 4 is rewritten as $$\delta_3 = (l_1 l_2 / EI) F (l_3 - \tfrac{1}{2} l_2) \tag{5}$$

Rearranging Eq. 5 and substituting Eq. 3 for 5, $$\delta_3 = \delta_2 [(2 l_3 / l_2) - 1] \tag{6}$$

When $l_3 = \tfrac{1}{2} l_2$ in Eq. 5 then the deflection $\delta_3 = 0$. This indicates that the deflection rod pivots about the point C located on the tube axis at a distance one-half the length of the tube from the tube's free end.

Figure 3:
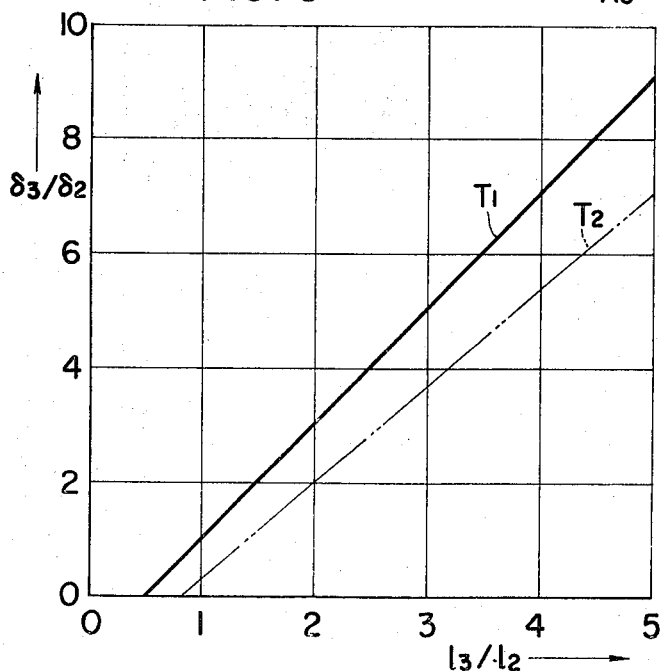
FIG. 3 is a diagram illustrating the ratio of displacements in the bending tube mechanism.
Figure 4A:
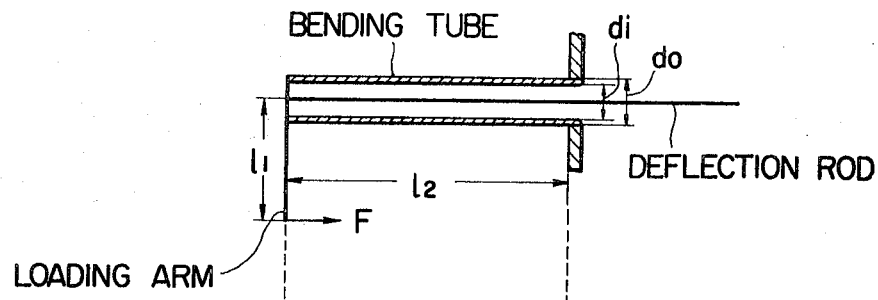
FIGS. 4(A) and 4(B) are diagrams illustrating the stress exerted on the bending tube of FIG. 1.

The relation between the ratio $l_3/l_2$ and the ratio $\delta_3/\delta_2$ (hereinafter referred to as "displacement expansion ratio"), as given in Eq. 6, is graphically illustrated by the solid line $T_1$ in FIG. 3. The dot-and-dash line $T_2$ graphically illustrates the same displacement expansion ratio for the conventional bending tube force-displacement transducer having a bending tube of the same size. From FIG. 3 it can be seen that the displacement expansion ratio is larger for the novel bending tube force-displacement transducer equipped with a transverse loading arm than for the bending tube transducer not so equipped. In the ordinary bending tube transducer, the deflection rod pivots on the point C' located on the tube axis at a distance two-thirds the length of the tube from the tube's free end. Point C' is shown in FIG. 2. Therefore, the bending tube transducer equipped with a transverse loading arm may be manufactured to fit within a package of smaller dimensions than may be the conventional bending tube transducer.

b. Principles of the present invention which provide uniform distribution of stress on the cylindrical tube wall Referring now to FIG. 4(A), systematic parameters and operating principles of the present invention are again depicted. However, the inside diameter $d_i$ and outside diameter $d_o$ of the tube are now indicated. The total resultant stress $\sigma$ produced in the bending tube illustrated in FIG. 4(A) is the sum of the stress $\sigma_m$ due to the bending moment M and the stress $\sigma_t$ due to the compression of the force F. The resultant stress $\sigma$ is thus given as:

$$\sigma = \sigma_m + \sigma_t = \frac{M d_o}{2I} \cdot \frac{F}{\pi(d_o^2 - d_i^2)/4} \tag{7}$$

where $d_i$ is the inner diameter of the tube, and $d_o$ is the outer diameter of the tube.

Generally, the bending tube employed in this invention is reasonably thick because it should have both elastic and sealing properties. Hence, the stress $\sigma_t$ due to the compression of the force F is negligible when compared with the stress $\sigma_m$ due to the bending moment M. Therefore $$\delta \approx \delta_m = M d_o / 2I = l_1 F d_o / 2I \tag{8}$$

Figure 4B:
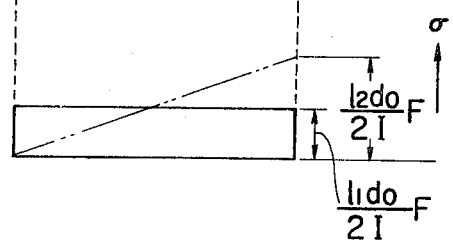

The stress $\sigma$ produced in the bending tube transducer equipped with transverse loading arm is thus determined by the expression $l_1 F d_o / 2I$. As shown in FIG. 4(B), a stress diagram of a bending tube in a device embodying the present invention, the length of the tube does not change the value of this stress $\sigma$. The dot-and-dash line in FIG. 4(B) graphically illustrates the moment of the ordinary bending tube transducer where the moment is given by the first order expression $l_2 F d_o / 2I$. Here the length of the tube $l_2$ has a direct effect on the value of the stress $\sigma$. Therefore, in the bending tube transducer equipped with a transverse loading arm, the stress $\sigma$ on the tube exists as an isostress, independent of the area of the bending tube. Thus, there is no partial concentration of stress on the cylindrical tube wall and likelihood of tube failure due to permanent deformation or shear is minimized.

c. Principles of the present invention which provide linear output response

Figure 5:
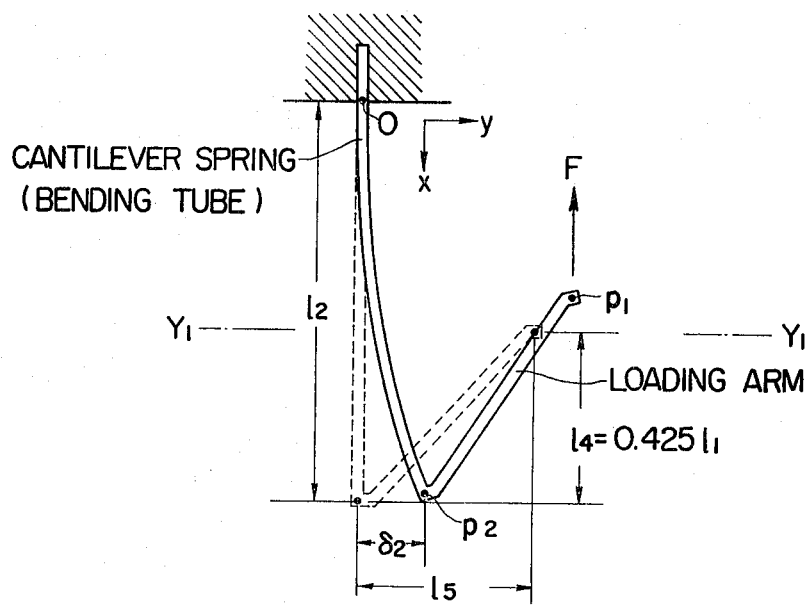
FIG. 5 is a diagram illustrating the device of the invention constructed to yield output linearity.

As previously described, a bending tube force-displacement transducer transduces an input force exerted on the free end of the tube into an output displacement appearing at the free end of the deflection rod. The deflection rod is connected at one end to the free end of the tube and pivots on a given point. During this operation the bending tube acts as a cantilever. Hence, the displacement at the free end of the tube is proportional to the displacement at the free end of the deflection rod. FIG. 5 shows a mechanism having a cantilever type spring to which a rigid loading arm is connected. Construction of a force responsive device in accordance with the principles of the present invention which yields linear output response will be described with reference to FIG. 5.

Assume that the loading arm is displaced from one position, indicated by the dotted line, to another position indicated by the solid line by a force F exerted on the load point $p_1$ directed toward the y-axis. Then the displacement $\delta_2$ (i.e., the output displacement) at the follower point $p_2$ is given by general expression below.

$$\delta_2 = l_5(1 - \cos l_2 \sqrt{F/EI})/(l_4 \sqrt{F/EI} \sin l_2 \sqrt{F/EI} + \cos l_2 \sqrt{F/EI}) \tag{9}$$

When the rest position of the follower point $p_2$ is taken as the origin of the reference system, $l_4$ and $l_5$ represent the $x$ and $y$ components, respectively, of the loading point $p_1$. The bending arm (i.e., the spring) is pivoted at the point O positioned in a stationally supporting block. The pivot point O is located at a distance $l_2$ from the origin on the x-axis. There is a function $f(F) = \delta_2(F)$ which represents the relation between the input force F and the output displacement of device $\delta$. If the maximum input force is $F_o$, and the corresponding output is $f(F_o)$, then the deviation from linear response or the error in linearity of response $\epsilon_{50}$, at 50 percent of input is given as $$\epsilon_{50} = \left\{ \frac{f\left(\frac{F_o}{2}\right)}{f(F_o)} - \frac{1}{2} \right\} \times 100 \tag{10}$$

Similarly, when the range of values of the input force F is $F_o$, Eq. 9 may be rewritten as follows:

$$\delta_2(F) = \frac{l_5(1 - \cos \xi)}{(l_4/l_2)\xi \sin \xi + \cos \xi}$$

where $\xi = l_2 \sqrt{F/EI}$.

Applying this expression to Eq. 10, the error in linearity of response, $\epsilon_{50}$, is expressed as $$\epsilon_{50} = \left\{ \frac{\frac{l_5(1-\cos \xi_o/\sqrt{2})}{(l_4/l_2)\xi_o/\sqrt{2}\cdot\sin \xi_o/\sqrt{2}+\cos \xi_o/\sqrt{2}}}{\frac{l_5(1-\cos \xi_o)}{(l_4/l_2)\xi_o \sin \xi_o + \cos \xi_o}} - \frac{1}{2} \right\} \times 100$$

$$= \left\{ \frac{1-\cos \xi_o/\sqrt{2}}{1-\cos \xi_o} \right.$$

$$\left. \cdot \frac{(l_4/l_2)\xi_o \cdot \sin \xi_o + \cos \xi_o}{(l_4/l_2)\xi_o/\sqrt{2}\cdot\sin \xi_o/\sqrt{2}+\cos \xi/\sqrt{2}} - \frac{1}{2} \right\} \times 100$$

(11)

where $\xi_o = l_2 (F_o/EI)$

Figure 6:
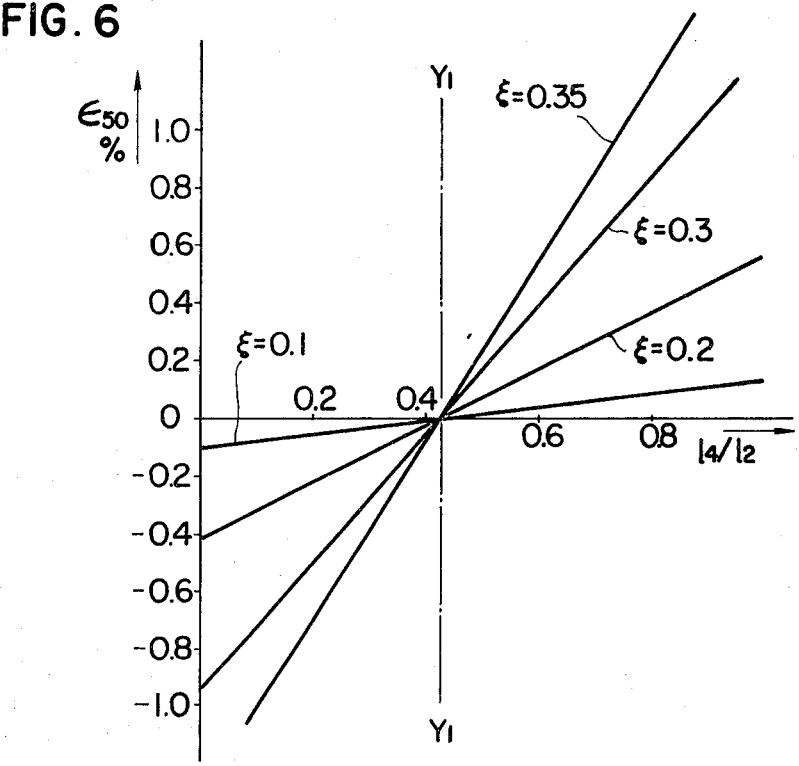
FIG. 6 is a diagram showing the relation between the load point position and the error which results from non-linear output response.

FIG. 6 graphically shows the relation between $\epsilon_{50}$ and the ratio $l_4/l_2$ when $\xi_o$ is suitably determined according to Eq. 11 for various values of $\epsilon_{50}$. It can be seen from FIG. 6 that the error in linearity of output response, $\epsilon_{50}$, with respect to force F at the output displacement $\delta_2$, is negative when $l_4/l_2 < 0.425$; that it is positive when $l_4/l_2 > 0.425$; and that it is zero when the load point $p_1$ is located on a $Y_1$–$Y_1$ line that perpendicularly intersects the x-axis at a distance 425/1000 of the length of the bending arm from the follower point $p_2$. That is when $l_4 = 0.425\ l_2$, the error in linearity of output response is zero. Hence, if the load point $p_1$ on the loading arm is located on a straight line $Y_1$–$Y_1$ perpendicular to the axis of the tube and intersecting the axis of the tube at a distance about 2/5 the length of the bending tube, from the tube's free end, then the force-displacement transducer constructed in accordance with this invention can have a linear output characteristic.

Figure 7:
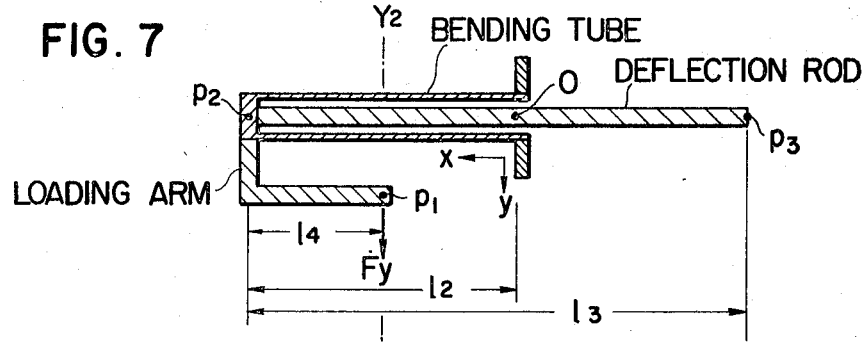
FIG. 7 is a diagram showing a state of the bending tube when subjected to lateral force.
Figure 8:
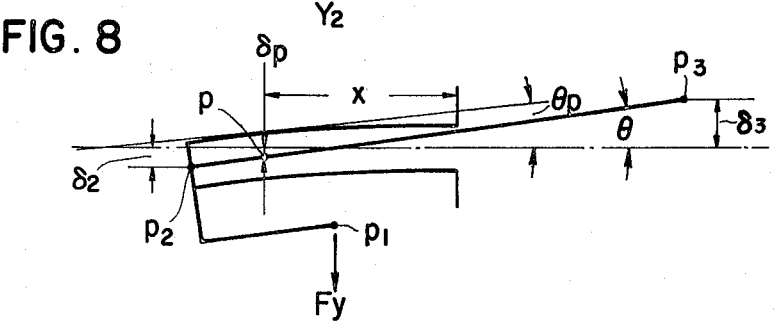
FIG. 8 is a diagram showing operation of the bending tube of FIG. 7.

The force responsive device of the present invention seeks to produce a linear output response. Simultaneously, the device seeks to eliminate error which results when the lateral component of input force affects output response. As shown, a design which achieves the former objective is one in which $l_4 \approx (2/5)\ l_2$. A design which achieves the latter is one in which $l_4 \approx \frac{1}{2}l_2$. In practice it has been found that satisfactory results are obtained when $l_4 \approx \frac{1}{2}l_2$. Within the degree of accuracy of the device, the output response is linear and the error due to the lateral component of input force is insignificant when $l_4 \approx \frac{1}{2}l_2$. Therefore, this condition will be applied to the following detailed descriptions of the preferred embodiments of the present invention.

d. Principles of the present invention which permit the device to eliminate error due to the lateral component of input force A bending tube transducer equipped with a transverse loading arm and operating under the influence of a lateral component Fy of input force is illustrated in FIGS. 7 and 8. The lateral force component Fy acts upon the loading arm at the load point $p_1$ in the direction parallel to the y-axis, and effects a deflection rod displacement $\delta_3$ at the displacement point $p_3$. When the force Fy acts upon the load point $p_1$ as illustrated, the differential equation which represents the deflection curve of the bending tube is given as:

$$d^2y/dx^2 = (Fy/EI) (l_2 - l_4 - x)$$

Here the pivot point O of the bending tube, shown in FIG. 7, is the origin of the x-y coordinate system. If the point $p(x,y) = p$ represents a given point on the tube, this equation may be solved for the deflection angle $\theta p$ of the tube and for the deflection rod displacement, $\delta p$, in the y-direction at the point p, as follows:

$$\theta p = (Fy/EI) (l_2 - l_4)x - \frac{1}{2} x^2$$

(12)

$$\delta p = (Fy/EI) \frac{1}{2} (l_2 - l_4)^2 x - (1/6)x^3$$

(13)

When $x = l_2$, the deflection angle $\theta$ and the displacement $\delta_2$, in the y-direction at the follower point $p_2$ are given as $$\theta p_2 = \theta p(l_2) = \theta = (Fy/EI)(\frac{1}{2}l_2^2 - l_2 l_4)$$

(14)

$$\delta p_2 = \delta p(l_2) = \delta_2 = (Fy/EI)(\frac{1}{3}l_2^3 - \frac{1}{2}l_2^2 l_4)$$

(15)

The displacement $\delta_3$ at the displacement point $p_3$ may be determined by substituting Eqs. 14 and 15 into the following equation.

$$\delta_3 = \theta l_3 - \delta_2$$

yielding $$\delta_3 = (Fy/EI)[\frac{1}{2}l_2^2 - l_2 l_4)l_3 - \frac{1}{3}l_2^3 + \frac{1}{2}l_2^2\ l_4]$$

(16)

If the displacement point $p_3$ is constrained to remain stationary under the influence of the lateral input force component Fy, i.e., if the deflection rod displacement $\delta_3$ at the displacement point $p_3$ is constrained to equal zero, the term enclosed in brackets in Eq. (16) will be zero. Accordingly, the following condition will be satisfied.

$$\frac{1}{2}l_2^2 l_3 - l_2 l_3 l_4 - \frac{1}{3}l_2^3 + \frac{1}{2}l_2^2 l_4 = 0$$

or, $$l_4 = \frac{1}{2} l_2 [1 + (1/6 l_2/(l_3 - \frac{1}{2}l_2))]$$

(17)

The force-displacement transducer of the present invention is normally designed so that the output displacement, $\delta_3$, at displacement point $p_3$, is relatively large in relation to the input displacement $\delta_2$, at the follower point $p_2$. Thus $l_3$ is generally designed to be larger than $2l_2$. Hence, the second term enclosed in parentheses in Eq. 17 is insignificant and may be neglected, to yield the following condition.

$$l_4 \approx \frac{1}{2}l_2$$

Theoretically, then, the displacement point $p_3$ will not be displaced under the influence of a lateral component of input force Fy if the load point $p_1$ is located on a line $Y_2$–$Y_2$ that perpendicularly intersects the y-axis at a distance one-half the length of the bending tube from the follower point $p_2$. This location of the load point $p_1$ is illustrated in FIGS. 7 and 8.

e. Description of the various embodiments

Figure 9:
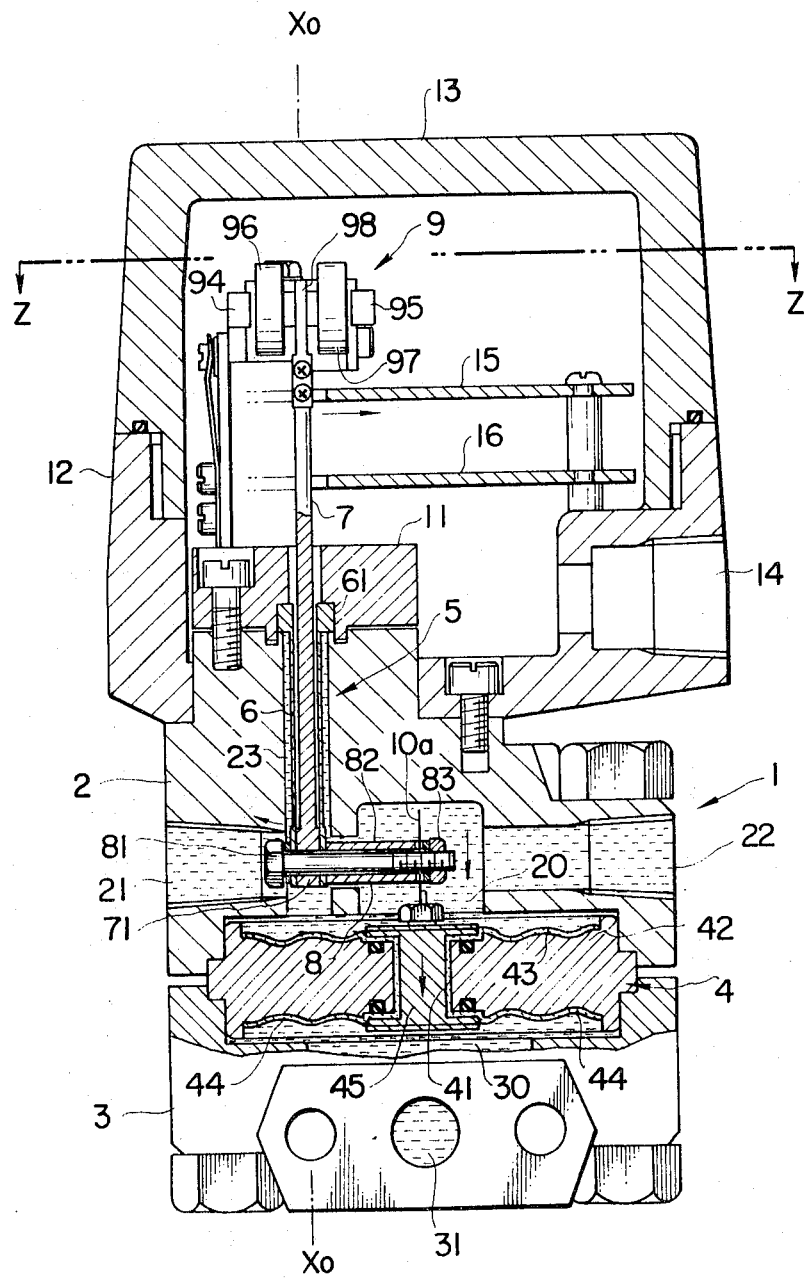
FIG. 9 is a sectional view showing structural features of one embodiment of the force responsive device of the invention.

Referring now to FIG. 9, a force responsive device constructed in accordance with a preferred embodiment of the present invention is shown in section. This embodiment is a differential pressure transmitter which includes a pressure receiving unit 1 having a casing comprised of forged, upper and lower support blocks 2 and 3. Air or drain vents 21 and 22, which communicate with a vertical bore 23 are located in the upper block 2. A pressure guide bore 31 is located in the lower block 3. A diaphragm capsule 4 is positioned between and supported by the upper and lower blocks 2 and 3. The capsule 4 includes an annular backup plate 42 having a hole 41 in the center, two diaphragms 43 and 44 having concentric corrugations on their inner faces, disposed on each side of the backup plate 42, and a moving member in the form of a spool-shaped plug 45, positioned in the backup plate hole 41. The respective center portions of the diaphragms 43 and 44 are linked together by the spool-shaped plug 45. The opposing sides of the backup plate 42 have similar concentric corrugations which accept the diaphragm corrugations when the diaphragm capsule 4 is assembled. Viscous oil with a small coefficient of expansion is hermetically enclosed in the space formed between the backup plate 42, diaphragms 43 and 44 and the spool-shaped plug 45. Two pressure receiving chambers 20 and 30 are disposed above and below the diaphragm capsule 4 in the upper and lower blocks 2 and 3, respectively. The lower pressure receiving chamber 30 communicates with the pressure guide bore 31 in the lower block 3, and the upper pressure receiving chamber 20 communicates with a pressure guide bore (not shown), which corresponds to the guide bore 31, disposed in the upper block 2. The upper pressure receiving chamber 20 then communicates with the high (or low) pressure side of a source of differential fluid pressure by means of the pressure guide bore. Similarly, the lower pressure receiving chamber 30 communicates with the low (or high) pressure side of the differential fluid pressure source by means of the pressure guide bore 31.

A bending tube force-displacement transducer 5 equipped with a transverse loading arm is mounted in the vertical bore 23. This transducer includes a bending tube 6 having concentric inner and outer diameters and a wall of uniform thickness, a deflection rod 7 mounted inside the tube 6 and fastened at one end to the moving end of the tube, and a loading arm 8 having one end fixed to the free end of the tube and the other end extending transversely, radially away from the tube axis.

The bending tube 6, deflection rod 7 and loading arm 8 are constructed in the following manner. A thin cylinder to be employed as the bending tube 6 is formed with a flange 61. Any suitable method of forming, for example, machining, may be utilized in this operation. The deflection rod 7, manufactured with a diametrally enlarged portion 71, is inserted into the tube 6. The enlarged portion 71 is tightly fitted in to one end of the tube 6. The base of the tube where the deflection rod is secured is soldered to hermetically seal the tube's end. The bending tube 6 is then inserted in the vertical bore 23 and secured to the upper block 2 at the flange 61. The loading arm 8 comprising a bolt 81, a collar 82 and a nut 83 is mounted in a transverse bore diametrically positioned in the base of the tube 6 and deflection rod 7. The tube 6 is located with its exterior exposed in the upper pressure receiving chamber 20. As noted, the interior of the tube 6 is hermetically sealed from pressure. The tube 6 is manufactured with a thin wall of uniform thickness to provide adequate tube elasticity for the function to be performed.

Figure 10:
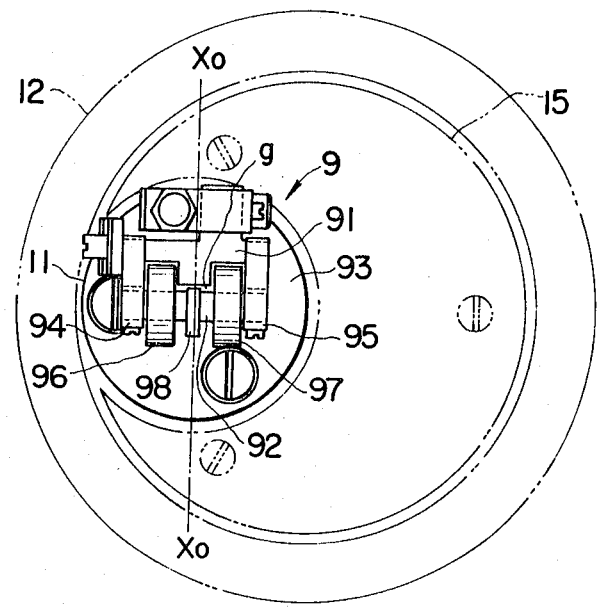
FIG. 10 is a sectional view taken through plane Z—Z of FIG. 9 looking down.

As illustrated in FIG. 10, a displacement-electric signal transducer 9 is also utilized to provide output response in an electrically recognized form. The displacement-electric signal transducer 9 includes a core 93 comprised of an E-shaped member 91 and an I-shaped member 92, fasteners 94 and 95 for fastening the E and I-shaped members 91 and 92 together, a pair of structurally identical coils 96 and 97 wound on the I-shaped member 92, and a short-circuit ring 98 made of copper, disposed in a flux gap $g$. The short-circuit ring 98 is mounted on the free end of the deflection rod 7. The core 93 is securely held above a support 11 which tightly clamps the tube flange 61 in the block 2 as shown in detail in FIG. 9. This displacement-electric signal transducer 9 is a differential inductor, in which the inductances of the two coils 96 and 97 change when the short-circuit ring 98 is displaced relative to the coils. When the sum of the currents flowing through these coils is controlled at a constant value, the difference in current flowing through the coils 96 and 97 is related to the relative displacement of the short-circuit ring 98.

An upper casing 12 provided with a lead outlet hole 14 is fastened onto the assembly block 2. A cover 13 is screwed in the upper casing 12 to seal the internal mechanism. Printed circuit boards 15 and 16 providing an amplifier, and other necessary electrical circuits are employed. A flexure 10a made of a thin plate interconnects the spool-shaped plug 45 and the loading arm 8. The force generated on the diaphragm capsule 4 by the differential pressure is transmitted to the force-displacement transducer mechanism 5 by the flexure 10a.

This force responsive device is operated in the following manner. Assume that the two pressure receiving chambers 20 and 30 contain fluid at the same pressure, that the moving member 45 is located in the center of the diaphragm capsule 4, and that the deflection rod 7 is held vertically with its axis positioned on the vertical line $X_o$—$X_o$. When a differential pressure is produced by fluid flow through the differential pressure source, the pressure in the upper chamber 20 increases (or decreases), thereby pushing the spool-shape plug moving member 45 down (or pulling the plug 95 up), and which, in turn, pulls the flexure 10a and the end of the loading arm 8 down (or pushes both up). When the loading arm is deflected, it applies a clockwise (or counterclockwise) moment (indicated by an arrow) to the bending tube 6, with the cumulative result that the tube 6 is bent, the deflection rod 7 is deflected rightward (or leftward), and the short-circuit ring 98 is displaced rightward (or leftward) from the reference line $X_o$—$X_o$. This result causes the displacement-electric signal transducer 9 to deliver an output signal which is calibrated to indicate the flow of the fluid in the observed system.

Figure 12:
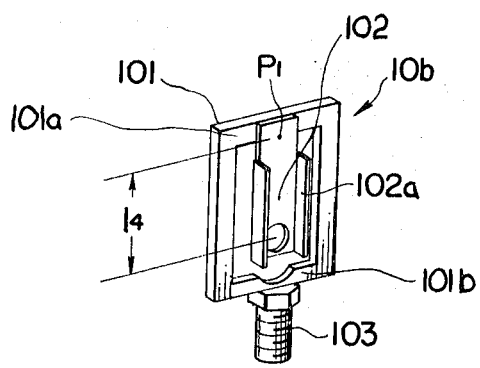
FIG. 12 is an enlarged perspective view showing a component of the device illustrated in FIG. 11.
Figure 11:
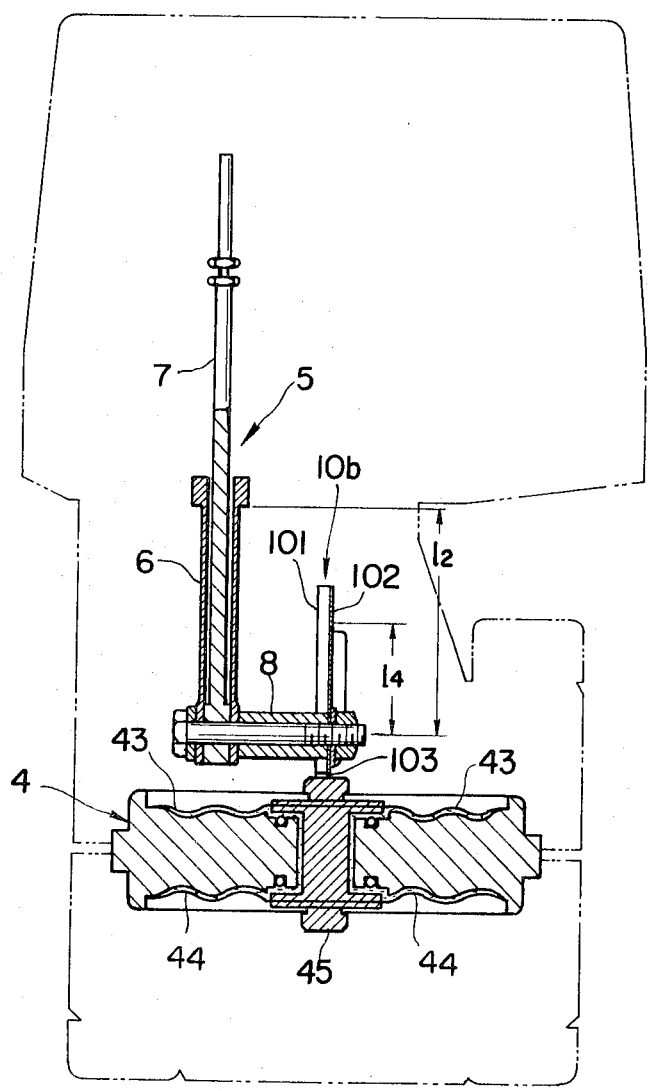
FIG. 11 is a sectional view showing structural features of another embodiment of the force responsive device of the invention.

FIG. 11 illustrates a second preferred embodiment of the present invention. This embodiment employs a flexure assembly 10b, as shown in FIG. 12, in place of the simple flexure 10a shown in FIG. 9. The loading arm 8 is similarly connected to the spool-shaped plug 45 by the more complex flexure 10b. Other structural features are nearly the same as those shown in FIGS. 9 and 10. The flexure assembly 10b includes a square frame 101 which has a frame top 101a and frame base 101b and which defines a square central hole, a flexure plate 102 with a portion 102a having a U-shaped cross-section, and a bolt 103. The loading arm 81 is coupled to the flexure plate 102 so that it does not interfere with the assembly's square frame. The length $l_4$ of the flexure plate 102 is about half the length $l_2$ of the bending tube 6. This arrangement permits input force to be applied to the loading arm 81-flexure plate configuration at a load point $p_1$ contained on a line which perpendicularly intersects the tube axis at a distance one half the tube length from the tube's free end. The minimizes error as a result of lateral components of input force and as a result of nonlinearity of output response as previously discussed. When a differential pressure is produced in the observed fluid system, the frame 101 is displaced upward to cause the deflection rod 7 to tilt leftward from the vertical reference line.

Figure 14:
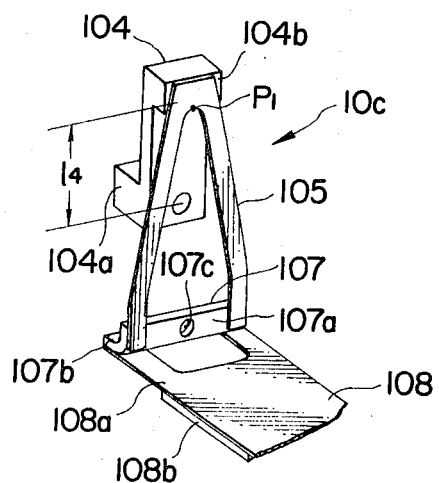
FIG. 14 is an enlarged perspective view showing a component of the device illustrated in FIG. 13.
Figure 13:
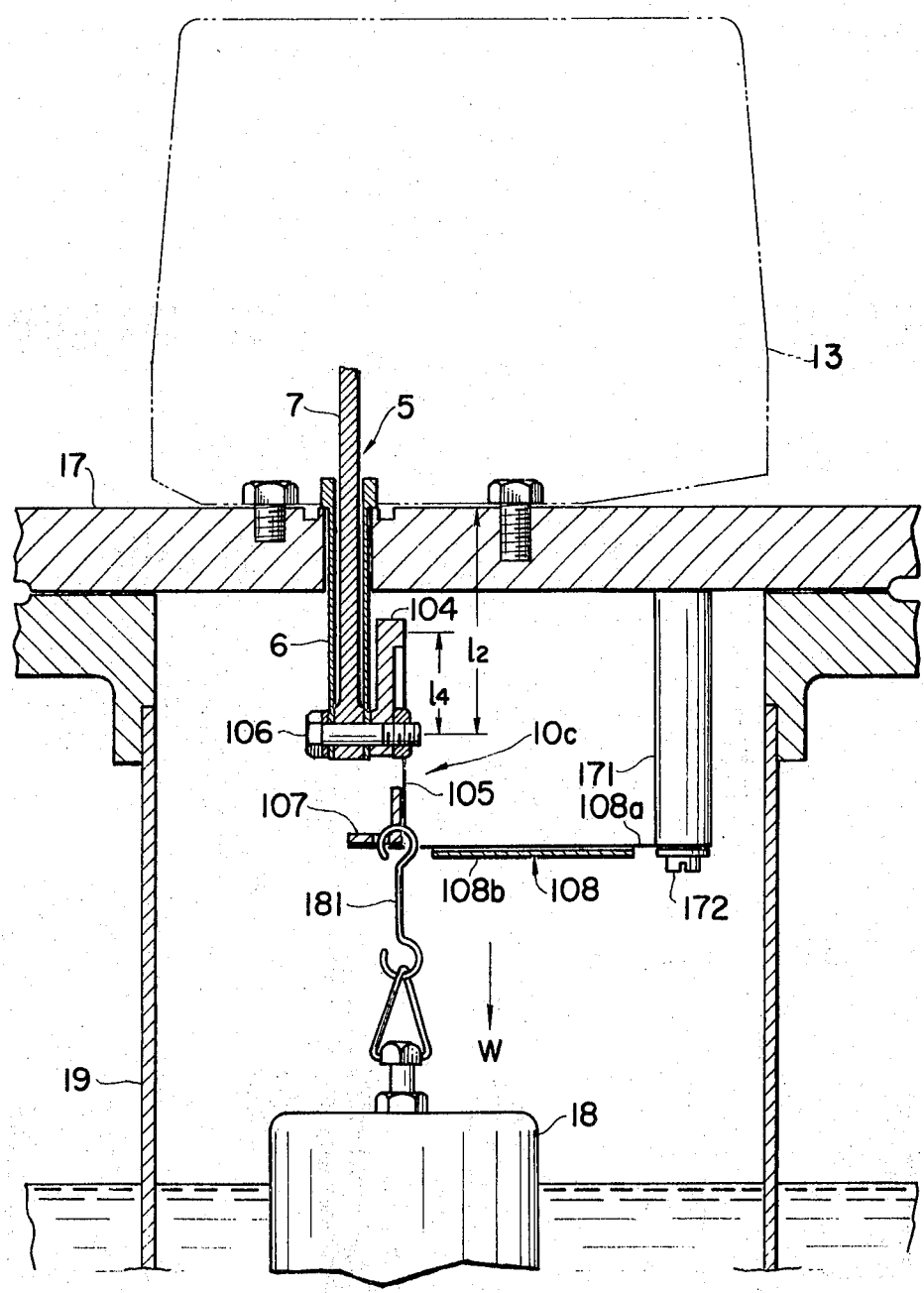
FIG. 13 is a diagram showing the essential parts of another embodiment of the force responsive device of the invention.

FIG. 13 illustrates a third preferred embodiment of the present invention, namely, a buoyancy transmitter. This force responsive device employs a flexure assembly 10c, shown in FIG. 14, which is equipped with an arm block 104 and an inverted V-shaped flexure plate 105. The arm block 104 has a S-shaped cross-section. The lower end 104a of the arm block 104 is connected to the bending tube 6 by a bolt 106 which forms the transverse section of the loading arm, and upper end 104b is welded to the vertex of the V-shaped flexure plate 105. In this structure the load point $p_1$ is located on a line which perpendicularly intersects the tube axis at a distance about half the length of the tube 6 from the tube's free end. The lower part of the flexure plate 105 is welded to a side 107a of an L-shaped connecting plate 107. A damper plate 108 having a thin leaf spring 108a and a thick patch plate 108b is mounted with its left end, as viewed in FIG. 13, connected to the lower side 107b of the connecting plate 107, and its right end secured to a rigid stud 171 by a mounting screw 172. This stud is implanted in a mounting board 17 located above the liquid system being observed. A hook 181 is inserted into a hole 107c located in the connecting plate 107, to provide a link to the flexure assembly 10c and an attachment member from which a displacer 18 is suspended. The specific gravity of the displacer 18 is larger than that of the liquid in the observed system. A vibration-preventing cylinder 19 positioned with its top fastened to the board 17 and its open bottom below the surface of the liquid in the observed system encloses the displacer 18. It prevents transverse fluctuant force conveyed through the liquid from reaching the displacer 18. The damper plate 108 may be vertically displaced at its left end, as viewed in FIG. 13, but its horizontal displacement is limited by the rigid stud 171 and mounting screw 172. This inhibits horizontal displacement of the flexure plate 105.

When the volume of liquid in the tank decreases and the liquid level recedes, the buoyancy exerted on the displacer 18 decreases and the load W increases, as indicated by the arrow in FIG. 13. When the load W increases the bending tube 6 bends due to the force exerted on it through the flexure plate 105, and arm block 104. As a consequence, the free end of the deflection rod 7 is displaced rightward as viewed in FIG. 13. This displacement is transduced into an electric signal, proportional to the buoyancy of the measuring liquid, by the displacement-electric signal transducer (not shown) in the same manner as described previously in reference to the differential pressure transmitter illustrated in FIG. 9.

In this embodiment, like the embodiment shown in FIG. 11, the load point $p_1$ is located on a line which perpendicularly intersects the bending tube axis at a point which is about one half the length of the tube distant from the tube's free end. By this arrangement the output displacement response of the device is linear, the error due to the lateral component of input force exerted on the bending tube is eliminated, and the output signal may be accurately proportioned to the buoyancy detected. Furthermore, when a buoyancy transmitter is constructed with a damper plate 108 and a vibration-preventing cylinder 19, as shown in FIG. 13, the lateral component of input force may be prevented even when the liquid in the observed system is moving past the device. Hence high accuracy of output response may be maintained.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

I claim:

1. A force responsive device of the type having a force-displacement transducer for transducing a force into a displacement, said transducer comprising:
a bending tube with one end fixed, a deflection rod held diametrally movable in the bending tube and fastened at one end in the vicinity of the free end of the bending tube, and a loading arm having a load point with one end fastened in the vicinity of the free end of the tube and with the other end extended transversely and adapted to have the force applied to the loading arm at the load point in the direction parallel with the axis of the bending tube.

2. A force responsive device as claimed in claim 1 wherein the load point on the loading arm is located in a plane including a straight line perpendicular to the axis of the bending tube and passing through a point which is located at a distance from the free end of the bending tube by 425/1000 to one-half of the length of the bending tube.

3. A force responsive device as claimed in claim 1 wherein the load point on the loading arm is located in a plane including a straight line perpendicular to the axis of the bending tube and passing through a point which is located at a distance from the free end of the bending tube by 425/1000 of the length of the bending tube,
whereby nonlinearity error is removed from the output displacement.

4. A force responsive device as claimed in claim 1 wherein the load point on the loading arm is located in a plane including a straight line perpendicular to the bending tube and passing through a point which is located at a distance from the free end of the bending tube by half of the length of the bending tube,
whereby the component of the force exerted laterally on the bending tube is removed.

5. A force responsive device of the type having a pressure receiving diaphragm capsule, a force-displacement transducer for transducing the force exerted on the pressurereceiving capsule into a displacement, and a displacement-electric signal transducer for transducing the displacement output of the force-displacement transducer into an electric signal, wherein said force-displacement transducer comprises a bending tube with one end fixed, a deflection rod held diametrally movable in the bending tube and fastened at one end in the vicinity of the free end of the bending tube, and a loading arm, having a load point, with one end fastened in the vicinity of the free end of the bending tube and with the other end extended transversely, said pressure receiving capsule being located with its axis parallel with the axis of said bending tube and being offset laterally from the axis of said bending tube, flexure connecting means connecting said capsule at its axis to said transverse loading arm, whereby the force due to the pressure exerted on the pressure receiving capsule is applied to the loading arm in the direction parallel with the axis of the bending tube.

6. A force responsive device as claimed in claim 5 wherein the load point on the loading arm is located in a plane including a straight line perpendicular to the axis of the bending tube and passing through a point which is located at a distance from the free end of the bending tube by 425/1000 to one-half of the length of the bending tube.

7. A force responsive device of the type having a displacer buoyed on the liquid in the observed system, a force-displacement transducer for transducing the load of the force due to the buoyancy exerted on the displacer into a displacement, and a displacement-electric signal transducer for transducing the displacement output of the force-displacement transducer into an electric signal wherein said force-displacement transducer comprises a bending tube with one end fixed, a deflection rod held diametrally movable in the bending tube and having one end fastened in the vicinity of the free end of the bending tube, and a loading arm, having a load point, with one end fastened in the vicinity of the free end of the bending tube and with the other end extended transversely, said displacer being located with its axis parallel to the axis of said bending tube and being offset laterally from the axis of said bending tube, flexure connecting means connecting said displacer at its axis to said transverse loading arm, whereby the load of the displacer is applied to the loading arm in the direction parallel with the axis of the bending tube.

8. A force responsive device as claimed in claim 7 wherein the load point on the loading arm is located in a plane including a straight line perpendicular to the axis of the bending tube and passing through a point which is located at a distance from the free end of the bending tube by 425/1000 to one-half of the length of the bending tube.

9. A force responsive device as claimed in claim 7 wherein the load point on the loading arm is located in a place including a straight line perpendicular to the axis of the bending tube and passing through a point which is located at distance from the free end of the bending tube by about half of the length of the bending tube, and a damper plate displaceable in one direction but not in other directions is disposed for removing the component of the force exerted laterally on the bending tube.

10. A force responsive device having a force-displacement transducer for transducing an input force in a displacement, said transducer comprising:
support means,
a bending tube having fixed and free ends, said fixed end being mounted in said support means and said free end being freely positioned away from said support means,
a deflection rod, having a displaceable output end and a mounting end, extending into said bending tube from said output end, diametrically spaced from the inner wall of said tube, said mounting end being fastened to said bending tube at its free end,
a transverse loading arm fastened to said free end of said tube and extending transversely from the axis of said tube, said deflection rod, said loading arm, and said tube being mounted to assume an initial rest position, said loading arm being positioned to have an input force applied to it directed parallel to the axis of said tube and to thereby bend said tube from its rest position and to displace said output end of said deflection rod.

11. The force responsive device as claimed in claim 10 wherein said loading arm has a loading point at which the input force is applied, said loading point being located on a line which perpendicularly intersects the axis of said tube at a distance 425/1000 to one-half the length of said tube from said free tube end.

12. The force responsive device as claimed in claim 10 wherein said loading arm has a loading point at which an input force is to be applied, said loading point being located on a line which perpendicularly intersects the axis of said bending tube at a point 425/1000 the length of said tube distant from said free tube end, whereby nonlinearity error is removed from the output displacement of said output deflection rod end.

13. The force responsive device as claimed in claim 10 wherein said loading arm has a loading point at which the input force is applied, said loading point being located on a line which perpendicularly intersects the axis of said bending tube at a distance one-half the length of said tube from said free tube end, whereby the component of input force exerted laterally on the bending tube is removed.

14. The force responsive device as claimed in claim 10 wherein said device is a differential pressure transmitter having a pressure receiving diaphragm capsule for exerting differential pressure on said transverse loading arm, said pressure receiving capsule being located with its axis parallel with the axis of said bending tube and being offset laterally from the axis of said bending tube, said device also having a flexure connecting means connecting said capsule at its axis to said transverse loading arm.

15. The force responsive device as claimed in claim 14 wherein said flexure connecting means comprises a frame coupled at its base to said diaphragm capsule and having a flexure plate with one end fastened at the top of said frame and the other end fastened to said loading arm, for positioning said loading point on a line which perpendicularly intersects the axis of said tube at a distance 425/1000 to one-half the length of said tube from said free end of said tube.

16. The force responsive device as claimed in claim 10 wherein said device is a buoyancy transmitter having a displacer buoyed on the liquid in the observed system for exerting a force on said transverse loading arm due to the buoyancy exerted on said displacer, said displacer being located with its axis parallel to the axis of said bending tube and being offset laterally from the axis of said bending tube.

said device also having a flexure connecting means connecting said displacer at its axis to said transverse loading arm.

17. The force responsive device as claimed in claim 16 wherein said flexure connecting means comprises a frame coupled at its base to said displacer and having an arm block with one end fastened at the top of said frame and the other end fastened to said loading arm for positioning said loading point on a line which perpendicularly intersects the axis of said tube at a distance 425/1000 to one-half the length of said tube from said free end of said tube.

18. The force responsive device as claimed in claim 17 wherein a damper plate is disposed between said support means and said flexure connecting means frame for removing the lateral component of force exerted on the bending tube by the displacer.

* * * * *

UNITED STATES PATENT OFFICE
CERTIFICATE OF CORRECTION

Patent No. 3,795,140            Dated March 5, 1974

Inventor(s)    TADASHI NISHIHARA

It is certified that error appears in the above-identified patent and that said Letters Patent are hereby corrected as shown below:

Column 5, line 15          Change "$\bar{6}7_2$" to --$\bar{0}2$--

Column 8, line 43          Delete "7".

Signed and sealed this 18th day of June 1974.

(SEAL)
Attest:

EDWARD M. FLETCHER, JR.          C. MARSHALL DANN
Attesting Officer               Commissioner of Patents